(12) United States Patent
Dean

(10) Patent No.: US 12,507,635 B2
(45) Date of Patent: Dec. 30, 2025

(54) SOLAR-POWERED OUTDOOR PLANT SUPPLEMENTAL LIGHT SYSTEM

(71) Applicant: Jamaica Dean, Winston Salem, NC (US)

(72) Inventor: Jamaica Dean, Winston Salem, NC (US)

( * ) Notice: Subject to any disclaimer, the term of this patent is extended or adjusted under 35 U.S.C. 154(b) by 0 days.

(21) Appl. No.: 19/081,145

(22) Filed: Mar. 17, 2025

(65) Prior Publication Data

US 2025/0324927 A1    Oct. 23, 2025

Related U.S. Application Data

(60) Provisional application No. 63/636,134, filed on Apr. 19, 2024.

(51) Int. Cl.

| | |
|---|---|
| *A01G 7/04* | (2006.01) |
| *F21L 4/02* | (2006.01) |
| *F21L 4/04* | (2006.01) |
| *F21L 4/08* | (2006.01) |
| *F21S 9/03* | (2006.01) |
| *F21V 3/06* | (2018.01) |
| *F21V 15/01* | (2006.01) |
| *F21V 21/06* | (2006.01) |
| *F21V 21/108* | (2006.01) |
| *F21V 21/22* | (2006.01) |
| *F21V 21/30* | (2006.01) |
| *F21V 31/00* | (2006.01) |

(Continued)

(52) U.S. Cl.
CPC .............. *A01G 7/045* (2013.01); *F21L 4/02* (2013.01); *F21L 4/04* (2013.01); *F21L 4/08* (2013.01); *F21S 9/037* (2013.01); *F21V 3/062* (2018.02); *F21V 15/01* (2013.01); *F21V 21/06* (2013.01); *F21V 21/108* (2013.01); *F21V 21/22* (2013.01); *F21V 21/30* (2013.01); *F21V 31/005* (2013.01); *F21W 2131/109* (2013.01); *F21Y 2113/13* (2016.08); *F21Y 2115/10* (2016.08)

(58) Field of Classification Search
CPC ......... A01G 7/045; F21V 21/22; F21V 21/30; F21S 9/037; F21W 2131/109
See application file for complete search history.

(56) References Cited

U.S. PATENT DOCUMENTS

| | | |
|---|---|---|
| 4,596,150 A | 6/1986 | Kuhr |
| 4,835,664 A | 5/1989 | Wen |

(Continued)

*Primary Examiner* — William N Harris
(74) *Attorney, Agent, or Firm* — Brennan, Manna & Diamond, LLC

(57) ABSTRACT

A solar-powered outdoor plant supplemental light system designed to enhance plant growth in shaded areas is disclosed. The system comprises a stable base, a telescoping arm adjustable in length via a knob, and a detachable solar-powered lighting unit. The lighting unit includes a housing with a solar panel that converts solar energy into electric power, which then illuminates a plurality of LED lights directed at the plants. The system features a weatherproof LED cover, a timer dial for setting light exposure duration, a battery power indicator, an integrated battery, and a solar panel connector for additional power. A sensor adjusts the lighting unit towards sunlight and automates the LED operation at dusk and dawn. The LEDs can emit blue or red light to support different plant growth stages and/or plant varieties.

20 Claims, 6 Drawing Sheets

(51) Int. Cl.
*F21W 131/109* (2006.01)
*F21Y 113/13* (2016.01)
*F21Y 115/10* (2016.01)

(56) References Cited

U.S. PATENT DOCUMENTS

| | | | |
|---|---|---|---|
| 8,590,207 B1 | 11/2013 | Shih | |
| 9,874,326 B1 | 1/2018 | Dai | |
| 11,297,775 B1* | 4/2022 | Quazi | A61L 2/26 |
| 11,435,068 B1* | 9/2022 | Ding | F21V 21/24 |
| 2006/0187656 A1* | 8/2006 | Kuelbs | F21S 9/035 |
| | | | 362/183 |
| 2006/0272210 A1 | 12/2006 | Bissonnette | |
| 2009/0086470 A1* | 4/2009 | Schafer | F21V 21/22 |
| | | | 362/122 |
| 2015/0131274 A1 | 5/2015 | Liu | |
| 2015/0351325 A1* | 12/2015 | Shelor | H05B 45/22 |
| | | | 47/58.1 LS |
| 2016/0192598 A1* | 7/2016 | Haggarty | H05B 47/16 |
| | | | 315/297 |
| 2021/0274721 A1* | 9/2021 | Tsao | F21V 21/24 |

\* cited by examiner

SOLAR-POWERED OUTDOOR PLANT SUPPLEMENTAL LIGHT SYSTEM

CROSS-REFERENCE TO RELATED APPLICATION

The present application claims priority to, and the benefit of, U.S. Provisional Application No. 63/636,134, which was filed on Apr. 19, 2024, and is incorporated herein by reference in its entirety.

FIELD OF THE INVENTION

The present invention generally relates to the field of illumination systems. More specifically, the present invention relates to a novel solar-powered device for extending sunlight to an outdoor garden in an area of predominant shade. The device includes at least one solar panel and a plurality of LEDs. The device can be adjusted in height to accommodate different outdoor plant storage areas. The solar panels can generate power to the LED lights. The light exposure enables plants to reach optimal growth levels despite being grown in heavily shaded outdoor areas. Accordingly, the present disclosure makes specific reference thereto. Nonetheless, it is to be appreciated that aspects of the present invention are also equally applicable to other like applications, devices, and methods of manufacture.

BACKGROUND

By way of background, individuals enjoy placing flowers, vegetables, and various types of plants in outdoor areas for aesthetic and environmental reasons. Individuals also cultivate plants in gardens, patios, and balconies to enhance the beauty of their surroundings and contribute to a healthier environment. However, such outdoor plants frequently suffer from inadequate sunlight due to the presence of nearby buildings, homes, garages, and other structures that cast extensive shadows throughout the day.

Lack of sufficient sunlight can severely hinder plant growth, leading to stunted development and poor health. Without adequate light, photosynthesis is compromised, resulting in reduced energy production for the plants. As a result, individuals may experience disappointment due to the diminished yield of herbs and vegetables. Lack of plant growth due to inadequate sunlight discourages many individuals from placing plants in their outdoor spaces. Individuals desire a solution that can provide supplemental light to shaded plants to promote growth of plants.

Therefore, there exists a long-felt need in the art for a solar-powered supplemental light system for outdoor plants. There is also a long-felt need in the art for a system that maximizes light exposure to improve plant growth in outdoor areas that are predominantly covered in shade. Additionally, there is a long-felt need in the art for a special device that can expose plants to illumination. Moreover, there is a long-felt need in the art for a uniquely designed device that has a solar panel and LEDs powered by the solar panel to illuminate at least one plant. Further, there is a long-felt need in the art for a system that provides supplemental light to outdoor gardens situated in shaded areas. Furthermore, there is a long-felt need in the art for a plant growth promoting device that provides necessary light exposure to plants to grow them optimally. Finally, there is a long-felt need in the art for a uniquely designed system that enables plants to reach optimal growth levels despite being grown in heavily shaded outdoor areas.

The subject matter disclosed and claimed herein, in one embodiment thereof, comprises a solar-powered outdoor plant supplemental light system. The system can be used with outdoor plants for providing illumination to promote plant growth. The system features a base configured to provide stability and support on outdoor surfaces. A telescoping arm extends vertically from the base, is adjustable in length, and includes a knob for extending and retracting the telescoping arm. A solar-powered lighting unit is detachably fastened to a top end of the telescoping arm and includes a housing, a solar panel, a plurality of LEDs to illuminate a plant positioned below the housing and a weatherproof LED cover detachably connected to the housing to protect the LED lights from physical damage and weather elements. A solar panel connector is included in the housing and is adapted to receive a connection from an external solar panel to provide additional electric power to the integrated battery.

In this manner, the solar-powered outdoor plant supplemental light system of the present invention accomplishes all of the foregoing objectives and provides users with a novel system that can provide supplemental light to shaded plants. The system includes a plurality of LEDs to provide necessary light exposure for a plant to grow optimally. The system can be adjusted to illuminate a plant and uses the solar panel for absorbing solar energy to generate electric power for LEDs. Using the system, plant growth can be optimized, ensuring plants receive healthy amounts of light exposure despite being grown in heavily shaded outdoor areas.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a solar-powered outdoor plant supplemental light system. The system comprises a base configured to provide stability and support on outdoor surfaces. A telescoping arm extends vertically from the base, is adjustable in length, and includes a knob for extending and retracting the telescoping arm. A solar-powered lighting unit is detachably fastened to a top end of the telescoping arm and includes a housing, a solar panel, a plurality of LEDs to illuminate a plant positioned below the housing and a weatherproof LED cover detachably connected to the housing to protect the LED lights from physical damage and weather elements.

In yet another embodiment, a solar-powered supplemental light system for outdoor plants that are placed in shaded areas is disclosed. The system includes a telescoping arm extending vertically from a base, the base is configured to provide stability and support on outdoor surfaces, a solar-powered lighting unit fastened to a top end of the telescoping arm, the solar-powered lighting unit includes a housing, a solar panel, and a plurality of LEDs, the housing has a battery power indicator disposed in the housing, adapted to display the power level of an integrated battery, the integrated battery is coupled to the solar panel for storing electric power generated by the solar panel, and the LEDs are directed to illuminate a plant positioned below the housing for promoting growth of the plant.

In another embodiment, a timer dial is disposed in the housing and is configured to set a specific duration for which the LED lights are illuminated.

In another aspect, a sensor is adapted to sense solar light and automatically orient the solar-powered lighting unit towards the solar light to enhance absorption of solar energy, and the sensor is further configured to automatically turn on the LED lights at dusk and turn them off at dawn.

In yet another aspect, the LED lights are configured to emit blue light in the wavelength range of 400-500 nm for vegetative growth, promoting strong root development and healthy leaf growth, and emit red light in the wavelength range of 600-700 nm for flowering and fruiting stages, such as bud formation and fruit production.

In still another embodiment, a solar panel connector is included in the housing and is adapted to receive a connection from an external solar panel to provide additional electric power to the integrated battery.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
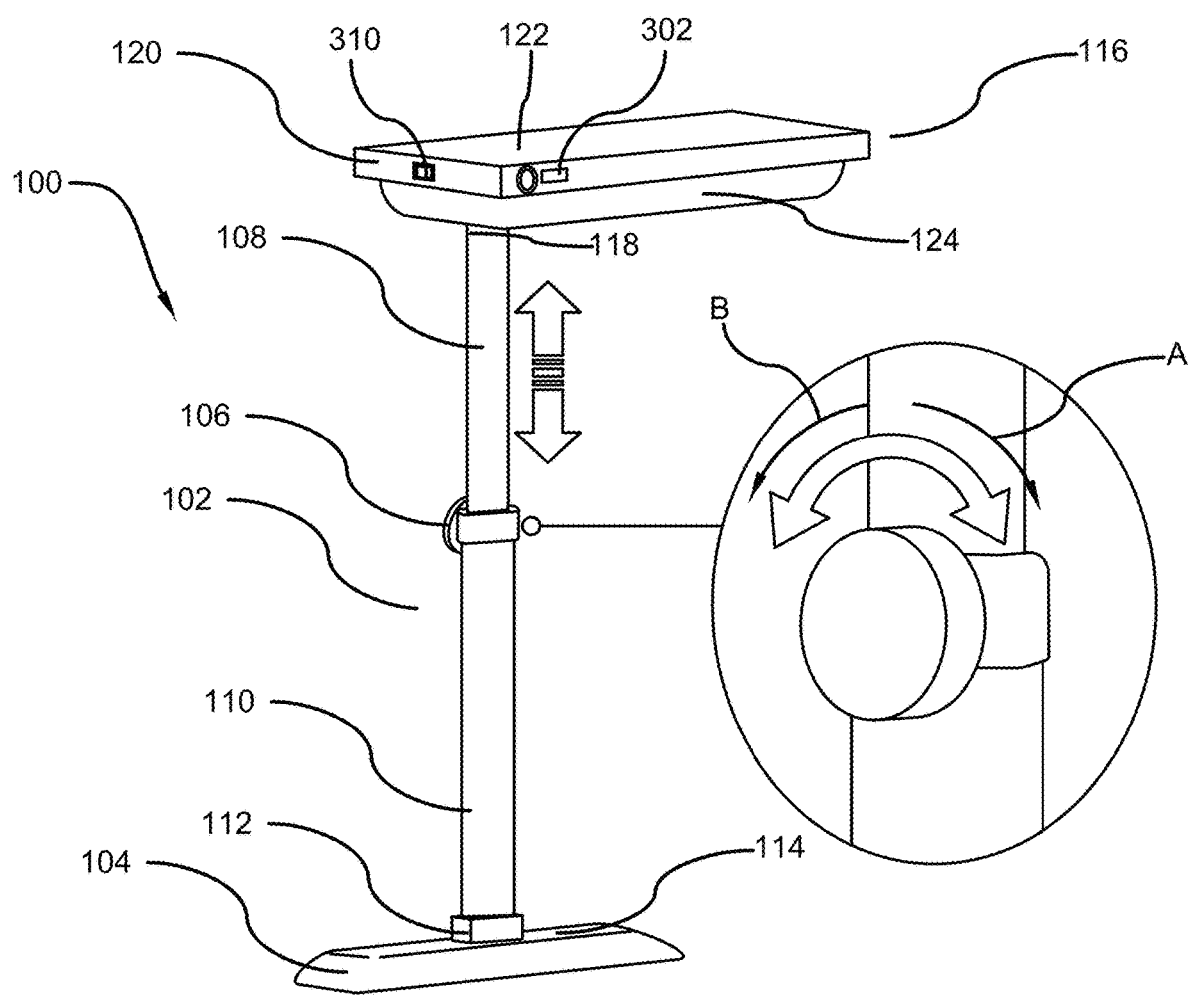
FIG. 1 illustrates a perspective view of solar-powered outdoor plant supplemental light system of the present invention in accordance with the disclosed structure.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for a solar-powered supplemental light system for outdoor plants. There is also a long-felt need in the art for a system that maximizes light exposure to improve plant growth in outdoor areas that are predominantly covered in shade. Additionally, there is a long-felt need in the art for a special device that can expose plants to illumination. Moreover, there is a long-felt need in the art for a uniquely designed device that has a solar panel and LEDs powered by the solar panel to illuminate at least one plant. Further, there is a long-felt need in the art for a system that provides supplemental light to outdoor gardens situated in shaded areas. Furthermore, there is a long-felt need in the art for a plant growth promoting device that provides necessary light exposure to plants to grow them optimally. Finally, there is a long-felt need in the art for a uniquely designed system that enables plants to reach optimal growth levels despite being grown in heavily shaded outdoor areas.

The present invention, in one exemplary embodiment, is a solar-powered supplemental light system for outdoor plants that are placed in shaded areas. The system includes a telescoping arm extending from a base, the base is configured to provide stability and support on outdoor surfaces, a solar-powered lighting unit is fastened to a top end of the telescoping arm, the solar-powered lighting unit includes a housing, a solar panel, and a plurality of LEDs, the housing has a battery power indicator disposed in the housing, adapted to display the power level of an integrated battery, the integrated battery is coupled to the solar panel for storing electric power generated by the solar panel, and the LEDs are directed to illuminate a plant positioned below the housing for promoting growth of the plant.

Reference will now be made in detail to the present preferred embodiments of the invention, examples of which are illustrated in the accompanying drawings. Wherever possible, the same reference numerals are used in the drawings and the description to refer to the same or like parts.

Referring initially to the drawings, FIG. 1 illustrates a perspective view of solar-powered outdoor plant supplemental light system of the present invention in accordance with the disclosed structure. The solar-powered outdoor plant supplemental light system 100 of the present invention is designed to provide light exposure to plants in outdoor areas that are predominantly covered in shade throughout the day. The light exposure is maximized to improve plant growth. More specifically, the solar-powered outdoor plant supplemental light system 100 can be designed as a portable device or alternatively can be fixed at an outdoor location. The supplemental light system 100 includes a telescoping arm 102 that extends vertically from a base 104. The base 104 can be made of marble or any other weatherproof material and is adapted to provide stability to the system 100. The base 104 can be placed on any outdoor surface and supports all types of terrains.

The telescoping arm 102 can be cylindrical, cuboidal, or of any other geometric shape and includes a knob 106 which can be turned in one direction (Arrow A) to extend the length of the telescoping arm 102 and can be turned in the opposite direction (Arrow B) to retract length of the telescoping arm 102. Specifically, the telescoping arm 102 includes a telescoping member 108 which can be pushed into or pulled out from the fixed length member 110 using the knob 106 to adjust length of the telescoping arm 102. The fixed length member 110 is removably attached to the base 104 via a groove member 112 disposed on the top surface 114 of the base 104.

Figure 2:
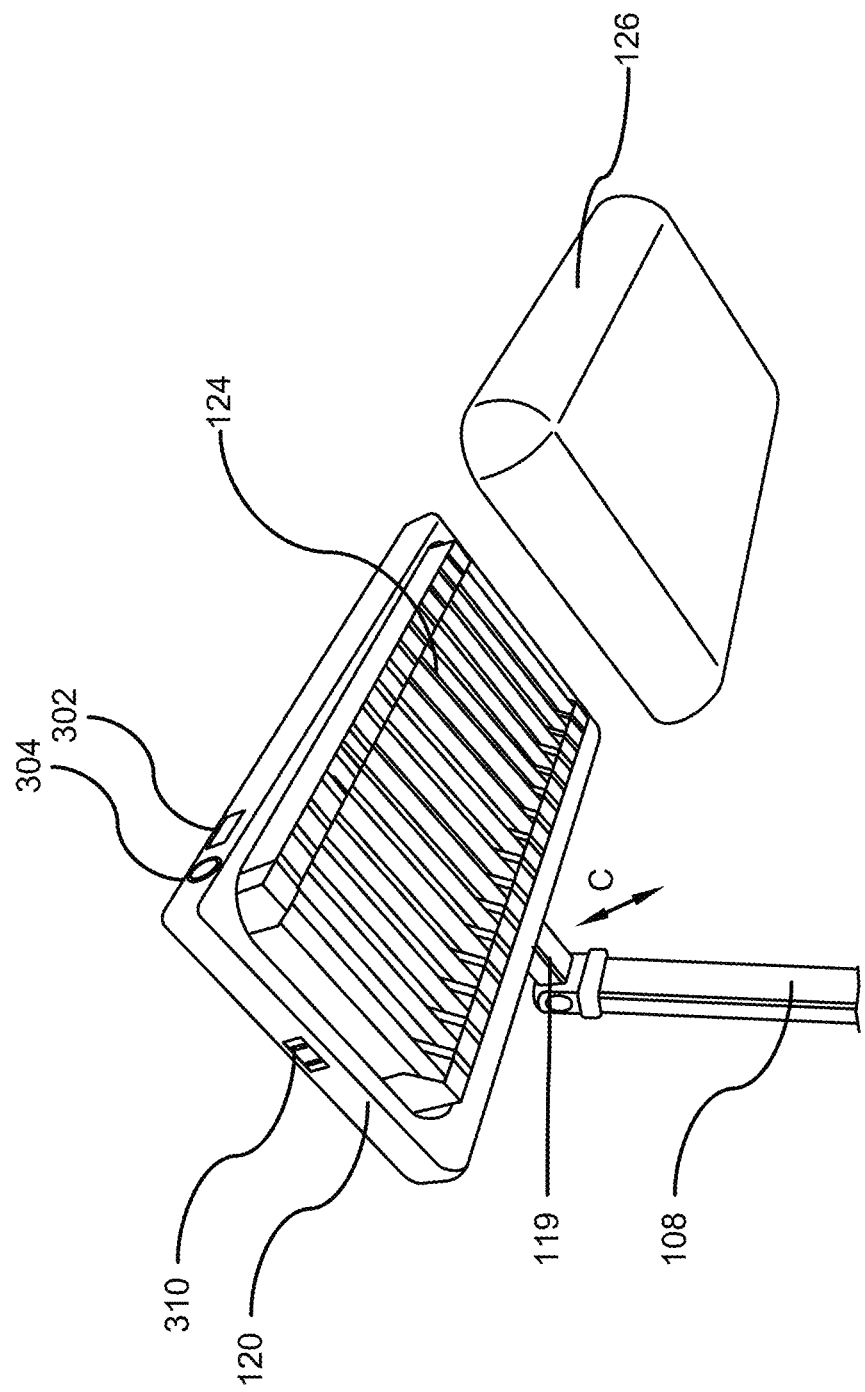
FIG. 2 illustrates an enlarged view of hinge system for orienting the solar-powered lighting unit in accordance with the disclosed structure.

A solar-powered lighting unit 116 is detachably fastened to the top end 118 of the telescoping arm 102 using a hinged connector 119 (FIG. 2). The solar-powered lighting system 116 includes a housing 120 and a solar panel 122 is disposed on top of the housing 120. The solar panel 122 is adapted to absorb solar energy and convert it into electric energy. A plurality of LED lights 124 are disposed in the housing 120 and are directed to illuminate a plant positioned below the housing 120. The LEDs 124 are powered by electric energy produced by the solar panel 122. The LEDs 124 provide additional light to the plants and help in optimizing plant growth. A weatherproof LED cover 126 is adapted to detachably connect to the housing 120 and is configured to protect the LEDs 124 from physical damage and other weather elements. The weatherproof LED cover 126 can be made of acrylic, plastic, and other similar materials and is preferably transparent or translucent.

Referring now to FIG. 2, depending on the orientation of the sunlight, the solar-powered lighting unit 116 can be adjusted using the hinged connector 119. The adjustment of the solar-powered lighting system 116 can be automatic or can be done manually. The hinged connector 119 is adapted to rotate in the direction represented by arrow C and enables the solar-powered lighting system 116 to move between a direction which is transversal to the telescoping arm 102 and a direction which is coplanar to the telescoping arm 102.

In different embodiments of the present invention, the LEDs 124 can illuminate blue light in the wavelength range of 400-500 nm and can be useful for vegetative growth, promoting strong root development and healthy leaf growth. In other embodiments, the LEDs 124 can illuminate red light in the range of 600-700 nm and is useful for flowering and fruiting stages such as bud formation, and fruit production. The system 100 is weatherproof, corrosion-resistant, and has an IP67 rating.

Figure 3:
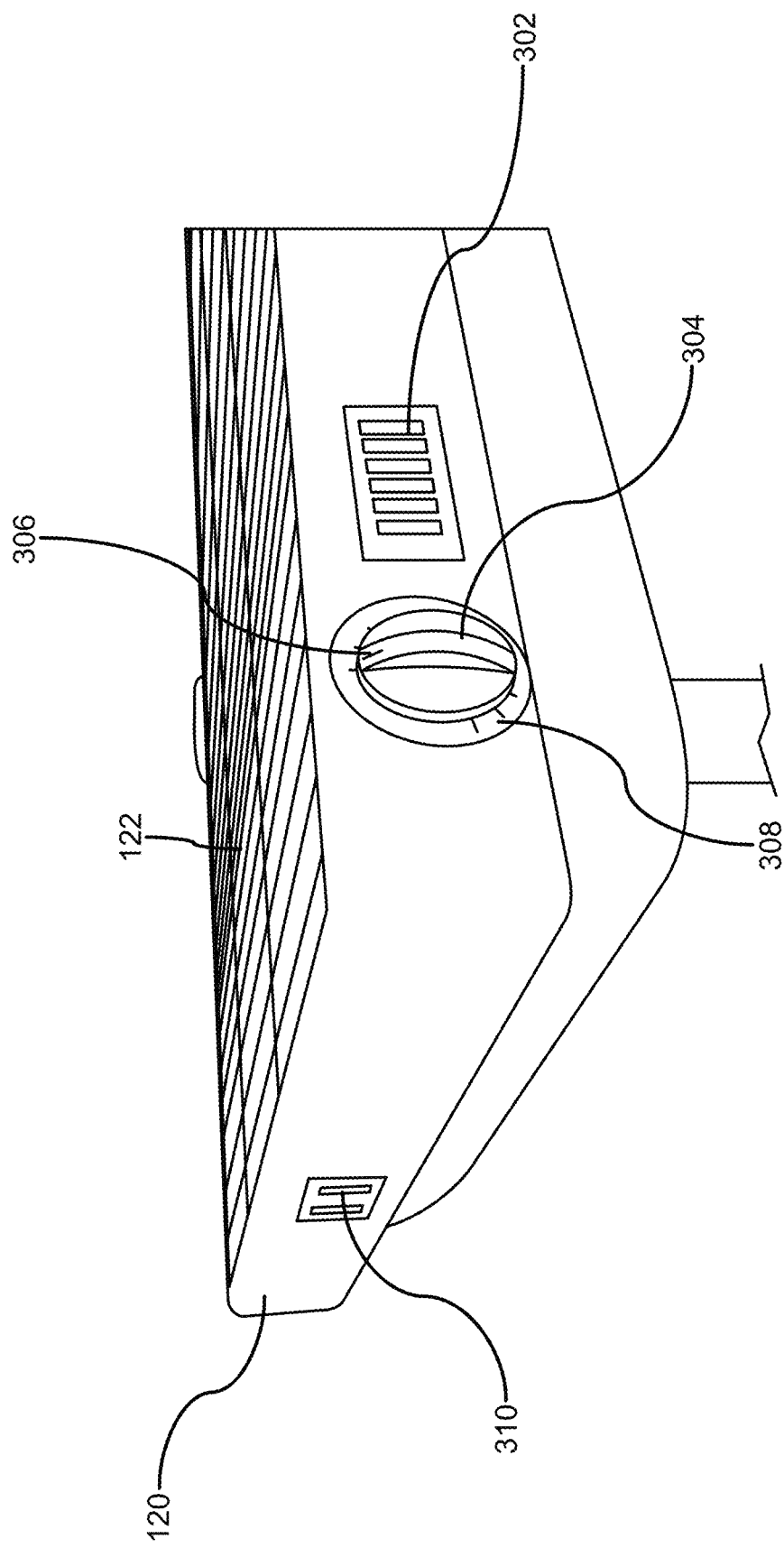
FIG. 3 illustrates a partial enlarged view of the solar-powered lighting system used in the solar-powered outdoor plant supplemental light system of the present invention in accordance with the disclosed structure.

FIG. 3 illustrates a partial enlarged view of the solar-powered lighting system 116 used in the solar-powered outdoor plant supplemental light system of the present invention in accordance with the disclosed structure. As illustrated, the solar-powered lighting unit 116 has a battery power indicator 302 disposed in the housing 120. The battery power indicator 302 is adapted to display a level of the power of the integrated battery 402 (FIG. 4) of the system 100. The electric power from the solar panel 122 is stored in the battery 402 and the stored energy is used for illuminating the LEDs 124. A timer dial 304 in the form of a knob is disposed in the housing 120 and can be set to a specific time duration for which the LEDs 124 provide the light to a plant. The dial 304 has a pointed end 306 which can be set to a specific timer value from different values 308 disposed on the dial 304.

For providing additional electric power for storage in the battery 402, a solar panel connector 310 is included in the housing 120. The solar panel connector 310 is adapted to receive a connection of an external solar panel. The connector 310 is coupled to the integrated battery 402 and provides electric power from the external solar panel to the battery 402 for operation of the LEDs 124.

Figure 4:
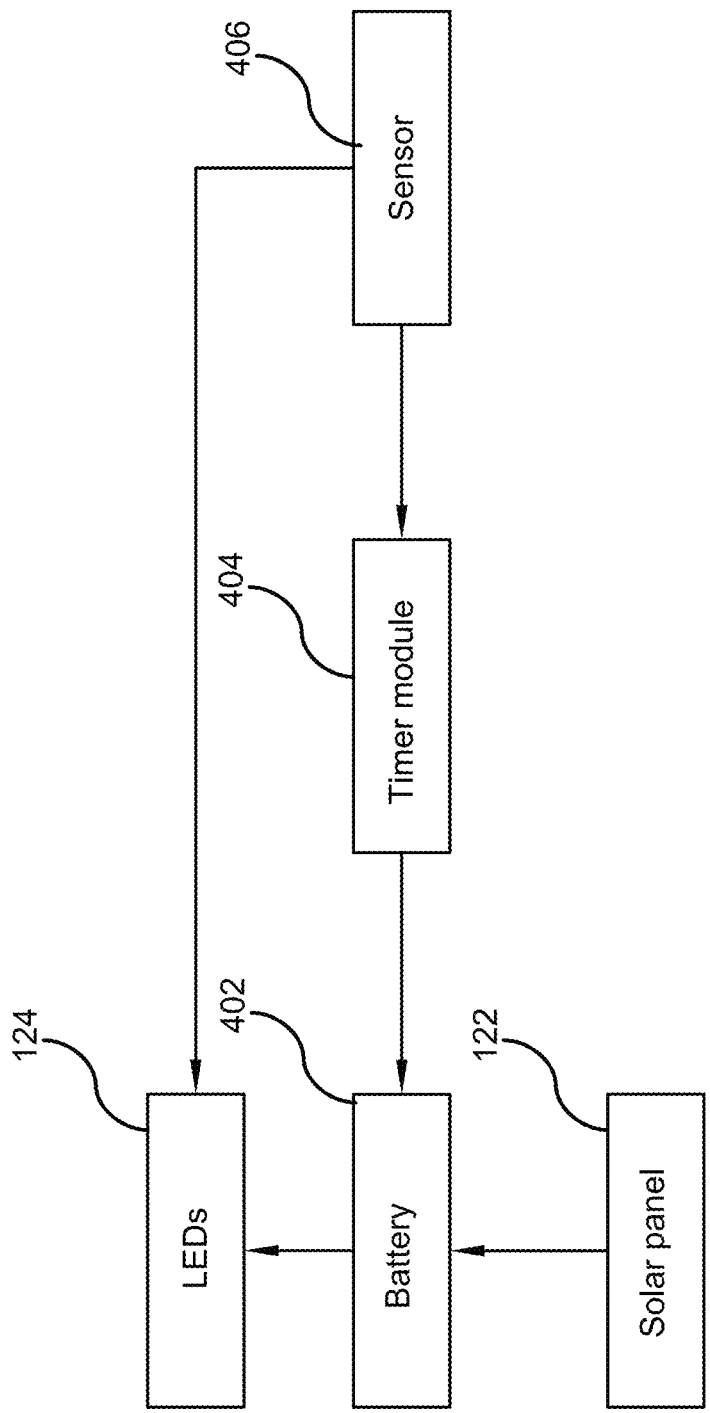
FIG. 4 illustrates a block diagram view showing internal electronic components of the solar-powered outdoor plant supplemental light system of the present invention in accordance with the disclosed structure.

FIG. 4 illustrates a block diagram view showing internal electronic components of the solar-powered outdoor plant supplemental light system of the present invention in accordance with the disclosed structure. The weatherproof solar-powered outdoor plant illumination system 100 includes a Li-Ion battery 402 for storing electric power generated by the solar panel 122 or external solar panel. The battery 402 can have capacity in the range from 2000 mAh to 10000 mAh. The battery 402 is coupled to the indicator 302 and the indicator 302 indicates the real-time battery power level. A timer module 404 is included in the system 100 and is coupled to the timer dial 304. The timer module 304 is set to a timer value using the timer dial 304 and the LEDs 124 are operated for the set timer value. A sensor 406 is adapted to sense solar light and automatically orient the solar-powered lighting unit 116 towards the solar light for enhancing absorption of the solar light and producing electric power. The sensor 406 is also adapted to automatically turn on the LEDs at dusk and off at dawn, thereby conserving energy.

Figure 5:
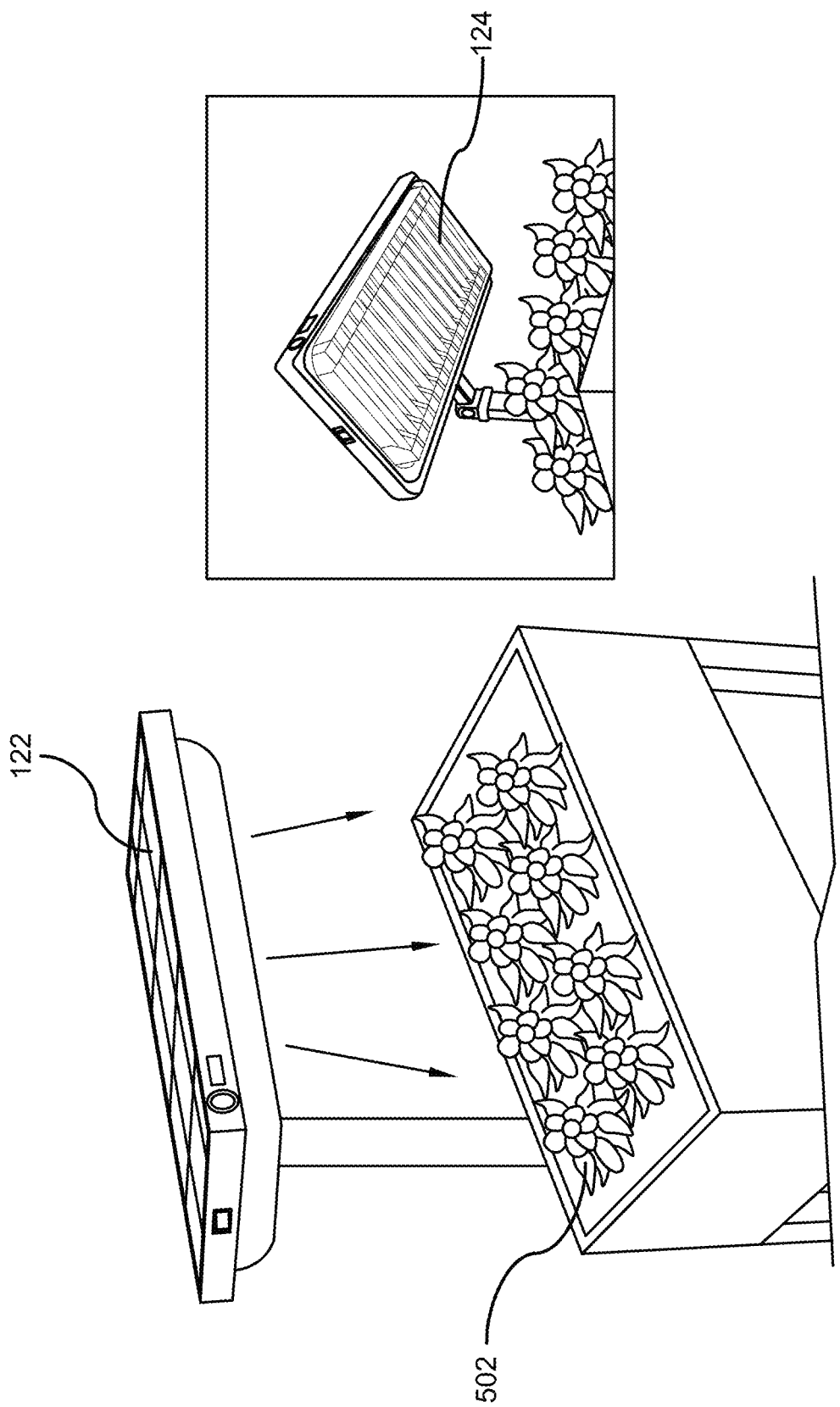
FIG. 5 illustrates a perspective view showing use of the solar-powered outdoor plant supplemental light system of the present invention for providing supplemental light to flowers in accordance with the disclosed structure.

FIG. 5 illustrates a perspective view showing use of the solar-powered outdoor plant supplemental light system of the present invention for providing supplemental light to flowers in accordance with the disclosed structure. In use, the solar-powered lighting unit 116 is positioned above a plant 502 by positioning the unit 116 and adjusting the telescoping arm 102. A timer value is set by the timer dial 304 and the LEDs 124 illuminate and transmit the light onto the plant/flowers 502 to promote the growth of the plant 502. The solar panel 122 simultaneously absorbs sunlight and recharges the battery 402.

Figure 6:
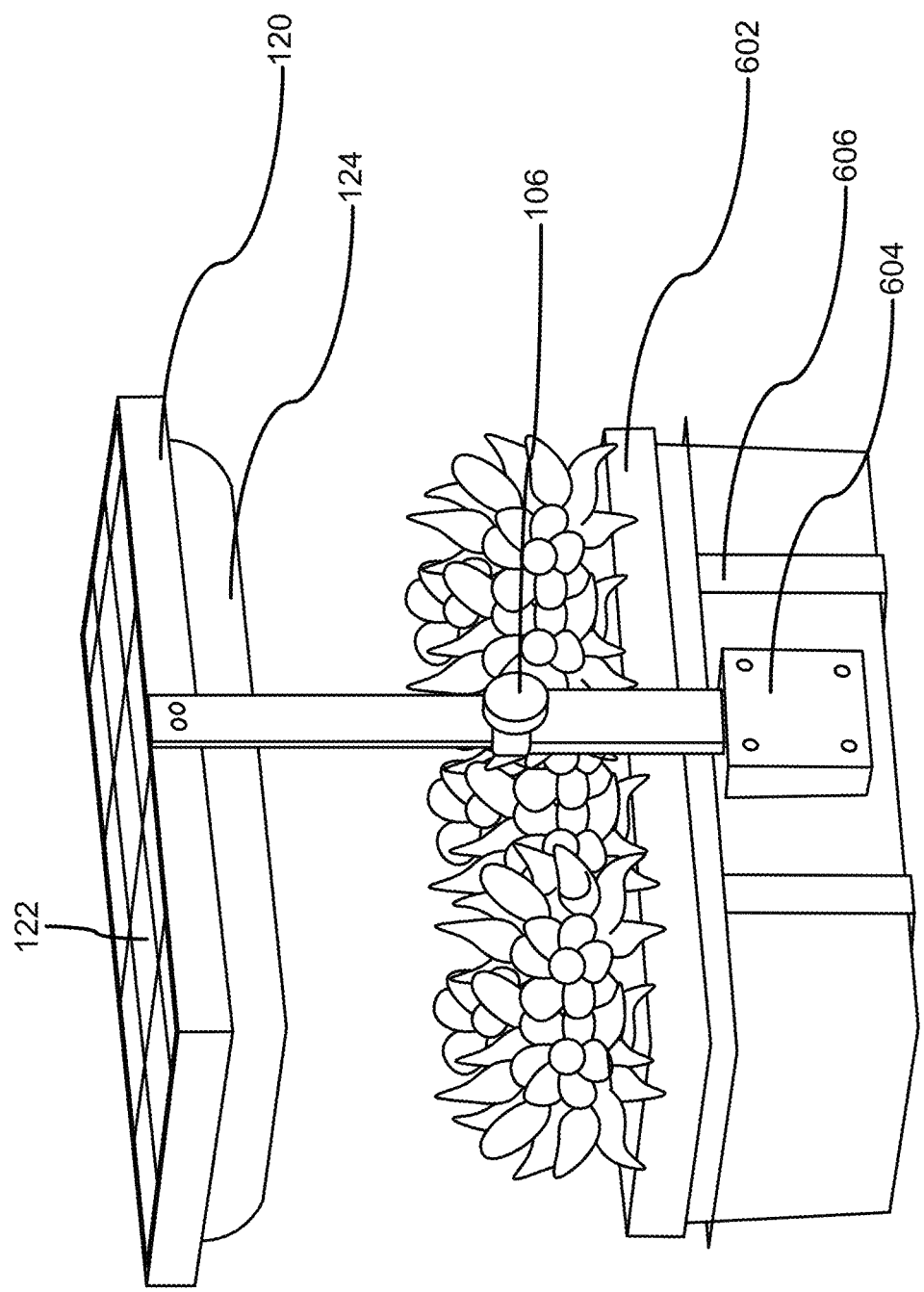
FIG. 6 illustrates a perspective view showing another plant being detachably fastened to the system in accordance with the disclosed structure.

FIG. 6 illustrates a perspective view showing another plant being detachably fastened to the enhanced patent illumination solar-powered system 100 in accordance with the disclosed structure. As illustrated, in the present embodiment, a plant body 602 is fastened to the telescoping arm 102 using a connector 604 and a frame body 606. The solar-powered lighting unit 116 is positioned above the plant body 602 for providing illumination to the plant body 602 to promote growth.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "enhanced patent illumination solar-powered system", "solar-powered outdoor plant supplemental light system", "weatherproof solar-powered outdoor plants illumination system", and "system" are interchangeable and refer to the solar-powered outdoor plant supplemental light system 100 of the present invention.

Notwithstanding the foregoing the solar-powered outdoor plant supplemental light system 100 of the present invention can be of any suitable size and configuration as is known in the art without affecting the overall concept of the invention, provided that it accomplishes the above-stated objectives. One of ordinary skill in the art will appreciate that the solar-powered outdoor plant supplemental light system 100 as shown in the FIGS. are for illustrative purposes only, and that many other sizes and shapes of the solar-powered outdoor plant supplemental light system 100 are well within the scope of the present disclosure. Although the dimensions of the solar-powered outdoor plant supplemental light system 100 are important design parameters for user convenience, the solar-powered outdoor plant supplemental light system 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A solar-powered outdoor plant supplemental light system comprising:
    a telescoping arm having a telescoping member and a fixed length member;
    a base;
    a knob;
    a telescoping member;
    a hinged connector;
    a housing;
    a solar panel; and
    a solar-powered light;
    wherein said telescoping arm extending vertically from said base;
    wherein said telescoping member selectively insertable in said fixed length member;
    wherein said knob turnable in a first direction to extend a length of said telescoping arm;
    wherein said knob turnable in a second direction to retract the length of said telescoping arm;
    wherein said fixed length member removably attached to said base;
    wherein said hinged connector detachably fastening said solar-powered light to a top end of said telescoping arm;
    wherein said hinged connector rotatable to move said solar-powered light between a direction transversal to said telescoping arm and a direction coplanar to said telescoping arm; and
    further wherein said solar-powered light having a plurality of LED lights disposed in said housing and directed to illuminate a plant positioned below said housing.

2. The solar-powered outdoor plant supplemental light system of claim 1, wherein said solar panel producing electric energy for said plurality of LED lights.

3. The solar-powered outdoor plant supplemental light system of claim 2, wherein said plurality of LED lights having a selectively detachable weatherproof LED cover.

4. The solar-powered outdoor plant supplemental light system of claim 2, wherein said plurality of LED lights illuminate blue light.

5. The solar-powered outdoor plant supplemental light system of claim 4, wherein said plurality of LED lights having a wavelength range from 400 nm to 500 nm.

6. The solar-powered outdoor plant supplemental light system of claim 2, wherein said plurality of LED lights illuminate red light.

7. The solar-powered outdoor plant supplemental light system of claim 6, wherein said plurality of LED lights having a wavelength range from 600 nm to 700 nm.

8. The solar-powered outdoor plant supplemental light system of claim 2, wherein said housing having a battery power indicator and an integrated battery and further wherein said battery power indicator displays a level of power of said integrated battery.

9. The solar-powered outdoor plant supplemental light system of claim 8 further comprising a timer dial, wherein said timer dial set to a duration for illuminating said plurality of LED lights.

10. A solar-powered outdoor plant supplemental light system comprising:
    a telescoping arm having a telescoping member and a fixed length member;
    a base;
    a knob;
    a telescoping member;
    a hinged connector;
    a housing;
    a solar panel;
    a solar-powered light;
    a battery power indicator; and
    an integrated battery;
    wherein said telescoping arm extending vertically from said base;
    wherein said telescoping member selectively insertable in said fixed length member;
    wherein said knob turnable in a first direction to extend a length of said telescoping arm;
    wherein said knob turnable in a second direction to retract the length of said telescoping arm;
    wherein said fixed length member removably attached to said base;
    wherein said hinged connector detachably fastening said solar-powered light to a top end of said telescoping arm;
    wherein said hinged connector rotatable to move said solar-powered light between a direction transversal to said telescoping arm and a direction coplanar to said telescoping arm;
    wherein said solar-powered light having a plurality of LED lights disposed in said housing and directed to illuminate a plant positioned below said housing;
    wherein said housing having said battery power indicator and said integrated battery; and
    further wherein said battery power indicator displays a level of power of said integrated battery.

11. The solar-powered outdoor plant supplemental light system of claim 10, wherein said solar panel producing electric energy for said plurality of LED lights.

12. The solar-powered outdoor plant supplemental light system of claim 11, wherein said plurality of LED lights having a selectively detachable weatherproof LED cover.

13. The solar-powered outdoor plant supplemental light system of claim 11, wherein said plurality of LED lights illuminate blue light.

14. The solar-powered outdoor plant supplemental light system of claim 13, wherein said plurality of LED lights having a wavelength range from 400 nm to 500 nm.

15. The solar-powered outdoor plant supplemental light system of claim 11, wherein said plurality of LED lights illuminate red light.

16. The solar-powered outdoor plant supplemental light system of claim 15, wherein said plurality of LED lights having a wavelength range from 600 nm to 700 nm.

17. The solar-powered outdoor plant supplemental light system of claim 11 further comprising a timer dial, wherein said timer dial set to a duration for illuminating said plurality of LED lights.

18. The solar-powered outdoor plant supplemental light system of claim 17, wherein said integrated battery is a Li-Ion battery having a capacity in the range from 2000 mAh to 10000 mAh.

19. A solar-powered outdoor plant supplemental light system comprising:
   a telescoping arm having a telescoping member and a fixed length member;
   a base;
   a knob;
   a telescoping member;
   a hinged connector;
   a housing;
   a solar panel; and
   a solar-powered light;
   wherein said telescoping arm extending vertically from said base;
   wherein said telescoping member selectively insertable in said fixed length member;
   wherein said hinged connector detachably fastening said solar-powered light to a top end of said telescoping arm;
   wherein said hinged connector rotatable to move said solar-powered light between a direction transversal to said telescoping arm and a direction coplanar to said telescoping arm;
   wherein said solar-powered light having a plurality of LED lights disposed in said housing and directed to illuminate a plant positioned below said housing; and
   further wherein said solar panel producing electric energy for said plurality of LED lights.

20. The solar-powered outdoor plant supplemental light system of claim 19, wherein said plurality of LED lights selectively illuminate a blue light and a red light, wherein said blue light having a wavelength range from 400 nm to 500 nm and further wherein said red light having a wavelength range from 600 nm to 700 nm.

* * * * *